Patented Sept. 9, 1952

2,610,216

UNITED STATES PATENT OFFICE 2,610,216

METHODS OF STABILIZING LATEX AND STABILIZED LATEX COMPOSITIONS

Alan Montague Hall, Leicester, England, assignor to B. B. Chemical Co., Boston, Mass., a corporation of Massachusetts No Drawing. Application April 11, 1950, Serial No. 155,348. In Great Britain April 16, 1949

8 Claims. (Cl. 260—820)

This invention is concerned with improvements in or relating to latex compositions and particularly to latex compositions stabilized against coagulation by polar solvents and a method of stabilizing a latex.

It is customary to add ammonia to rubber latex, at the locality where it is obtained, to stabilize the latex against coagulation and deterioration during shipment due, for example, to bacterial action, but where it is desired that rubber latex shall be sufficiently stable to ensure satisfactory handling by mechanical devices (for example by applying rollers or the like) it is generally found desirable to add additional stabilizers to the latex, usually protective colloids, e. g. bentonite, casein or glue; various proprietary stabilizers are also widely used.

Further, rubber latex stabilized merely by the addition of ammonia is not only liable to coagulate when handled by mechanical devices but also when polar solvents, e. g. ethyl alcohol, acetone or ethyl acetate are added thereto. Thus usually the addition of ethyl alcohol in anything other than small proportions will cause coagulation, either immediately or in a short time, especially where the latex has been concentrated, and it has proved difficult to compound rubber latex, even with additional stabilizers, in such a manner that any substantial proportion of a polar solvent may be added thereto and not bring about coagulation in a short time. In view of the sensitivity of rubber latex to additions of polar solvents the production of a stable composition comprising both rubber latex and a substance which is soluble, to any substantial extent, only in polar solvents has proved difficult to effect satisfactorily; the substance in question may, for example, be nitrocellulose or a phenol-aldehyde or other synthetic resin which is most satisfactorily emulsified in water in the form of its solution in a polar solvent.

It is a feature of the present invention to provide an improved method of stabilizing rubber latex against coagulation when handled by mechanical devices or when a substantial proportion of a polar solvent, e. g. ethyl alcohol is added.

It is a further feature of the invention to provide an improved rubber latex composition possessing exceptional stability against coagulation by mechanical handling or addition of polar solvents.

The improved latex of the present invention is an aqueous dispersion wherein the dispersed phase comprises rubber particles stabilized by association of the individual particles with a urea-casein reaction product precipitated thereon. A relatively small proportion of a solution of the reaction product is added to a latex, e. g., an aqueous dispersion comprising rubber particles in the disperse phase and thereafter the reaction product is precipitated, for example by addition of an excess of an aldehyde. The precipitated reaction product is associated with the individual particles of the rubber and provides the new stabilizing action. In the relatively small proportion required to inhibit coagulation of the rubber when handled by mechanical devices and addition of polar solvents, the reaction product does not prevent the rubber deposited from the latex from exhibiting its normal adhesive characteristics.

The reaction product which is to be associated with the dispersed rubber particles in the latex is prepared by heating together casein and urea in the presence of water. Ordinarily, both the urea and casein in the ratio of at least one-half part and preferably from two to four parts by weight of casein to one part of urea are added to a body of water and dissolved therein. The solution is then heated in a water bath preferably to a temperature of from 85° C. to 90° C. although lower temperatures may be used. On heating a violent frothing takes place due, apparently, to escape of gas generated in the reaction. Heating is continued until no further frothing is observed, at which time the reaction appears to be substantially complete. The resulting solution of reaction product is then cooled.

The latex to which the reaction product solution is to be added may be a natural rubber latex which may desirably though not necessarily have been concentrated in rubber solids, for example to 60% rubber solids. The latex normally contains a small percentage of ammonia for preservative purposes and is well on the alkaline side. Other alkaline material may be substituted for the ammonia. For example, monoethanolamine, methylamine and hexamine are quite satisfactory. Sodium carbonate and borax may also be used. Sufficient alkaline material is added to bring the pH value to 10–11.

The term "natural rubber latex" is employed in the specification and claims in its usual sense of referring to the naturally occurring dispersion of rubber particles in an aqueous medium either in the condition in which it was collected or in concentrated condition and does not include artificial redispersions of crude or reclaimed rubber.

The solution of reaction product is added to a latex in the proportion of not less than 1½ parts and preferably at least 4½ parts by weight solids to 100 parts by weight of rubber solids in the latex, and the solution and latex are thoroughly mixed together.

The mixture of latex and reaction product is then treated with an agent which causes the urea-casein reaction product to associate with or precipitate on the rubber particles in the latex. This precipitation or association is obtained by adding the agent, preferably an aldehyde, and suitably an aqueous formaldehyde solution to the mixture of latex and reaction product in amount sufficient to leave an excess after reacting with all the ammonia present. The excess of agent such as formaldehyde reacts at least in part with the urea-casein reaction product to precipitate it, presumably as an insoluble condensation product, upon the dispersed globules of the latex. Thus, if formaldehyde is added in excess to the solution of urea-casein reaction product it will cause immediate precipitation.

The precipitated reaction product of urea and casein is uniquely effective in protecting the rubber of the latex against coagulation by polar solvents. It is believed that this effectiveness may be due to a great insolubility or repellency toward polar solvents possessed by the precipitated reaction product. That is the precipitated material may be in the nature of an insoluble resinous condensation product of the casein-urea reaction product and the precipitation agent such as formaldehyde so that it remains effective to protect the rubber of the latex against coagulation even in the presence of polar solvents.

The following example is given as of possible assistance in understanding the invention and it is to be understood that the invention is not restricted to the details of proportions nor specific ingredients employed in the example:

A stock solution was prepared by mixing together 124 parts by weight of urea, 241 parts by weight of casein and 615 parts by weight of water. The mixture was then heated on a water bath. During heating the casein and urea reacted together and a violent frothing took place due, apparently, to escape of gas. Heat was continued until no further frothing was observed. 10 parts by volume of 0.800 specific gravity ammonia were then added to the hot liquid and the liquid was made up to 1040 parts by weight by addition of water and allowed to cool. The resulting stock solution had a solids content of about 35%.

200 parts by weight of a 60% natural rubber latex made slightly alkaline with ammonia were combined with 15 parts by weight of the above stock solution and was stirred to insure thorough mixing. 17 parts by weight of a 40% formaldehyde solution in water were diluted with 23 parts by weight of water and the resulting solution added to the above mixture. This quantity of formaldehyde was sufficient to react with all the ammonia present and leave a small amount of excess formaldehyde.

The resultant rubber latex composition was very slightly acid and had a solids content of about 50%. The latex composition was allowed to stand for seven days at room temperature before use. In use the rubber solids deposited from the latex exhibited essentially the adhesive characteristics possessed by rubber solids deposited from an unprotected rubber latex.

The protected rubber latex composition prepared according to the example was resistant to coagulation by mechanical handling. Also, the latex composition exhibited unusual stability against coagulation upon addition of a polar solvent and required the addition of 210 ccs. of ethyl alcohol to 100 gms. before flocculation occurred in the latex. The composition also was capable of tolerating addition of a substantial proportion of acid without coagulation.

Having described the invention, what I claim as new and desire to secure by Letters Patent of the United States is:

1. A natural rubber latex composition wherein the individual rubber particles have associated therewith the product of reaction of at least one-half part by weight of casein with one part by weight of urea, precipitated thereon by formaldehyde, the precipitated material being present to the extent of 1½ parts by weight to 100 parts by weight of rubber solids.

2. A natural rubber latex composition wherein the individual rubber particles have associated therewith the product of reaction of from two to four parts by weight of casein with one part by weight of urea precipitated on the particles by formaldehyde, the precipitated material being present to the extent of at least 1½ parts by weight to 100 parts by weight of rubber solids to inhibit coagulation of the rubber particles when polar solvents are added.

3. A natural rubber latex composition wherein the individual rubber particles have associated therewith the product of reaction of from two to four parts by weight of casein with one part by weight of urea percipitated on the particles of formaldehyde, the precipitated material being present to the extent of 4½ parts by weight to 100 parts by weight of rubber solids to inhibit coagulation of the rubber particles when polar solvents are added.

4. The method of treating an alkaline natural rubber latex to form a stable composition which includes the steps of precipitating by formaldehyde on the individual particles of rubber the reaction product of at least one-half part by weight of casein with one part by weight of urea, the precipitated product being present to the extent of 1½ parts by weight to 100 parts by weight of rubber solids.

5. The method of treating an alkaline natural rubber latex to form a stable composition which includes the steps of reacting one part by weight of urea with at least one-half part by weight of casein in the presence of water to form a soluble reaction product, adding the soluble reaction product to the dispersion and adding formaldehyde to the dispersion to precipitate the reaction product on the individual particles of rubber in the dispersion, at least 1½ parts by weight of reaction product being precipitated on 100 parts by weight of the rubber particles.

6. The method of treating an alkaline natural rubber latex to form a stable composition which includes the steps of reacting in the presence of water from two to four parts by weight of casein and one part by weight of urea to form a soluble reaction product, adding a solution of the reaction product to the aqueous dispersion to provide at least 1½ parts by weight of the reaction product to 100 parts by weight of rubber solids, and precipitating the reaction product on the individual particles of rubber by adding formaldehyde to the dispersion.

7. The method of treating an alkaline natural rubber latex to form a stable composition which includes the steps of reacting from two to four parts by weight of casein by one part by weight of urea in the presence of water to form a soluble reaction product, adding a solution of the reaction product to the latex to provide 4½ parts by weight of solids of the reaction product to 100 parts by weight of rubber solids in the dispersion, and precipitating the reaction product on the individual particles of rubber in the dispersion by adding formaldehyde.

8. The method of treating an ammoniated natural rubber latex to form a stable composition which includes the steps of reacting two parts by weight of casein by one part by weight of urea in the presence of water to form a soluble reaction product, adding a solution of the reaction product to the latex in the proportion of 4½ parts by weight of solids of the reaction product to 100 parts by weight of rubber solids in the dispersion, and precipitating the reaction product on the individual particles of rubber in the dispersion by adding formaldehyde in excess of the amount required to react with the ammonia.

ALAN MONTAGUE HALL.

REFERENCES CITED

The following references are of record in the file of this patent:

UNITED STATES PATENTS

| Number | Name | Date |
| --- | --- | --- |
| 1,967,639 | Wedger | July 24, 1934 |
| 1,971,522 | Dunham | Aug. 28, 1934 |
| 2,308,879 | Hirsch | Jan. 19, 1943 |

FOREIGN PATENTS

| Number | Country | Date |
| --- | --- | --- |
| 562,755 | Germany | Oct. 28, 1932 |